Figures 1, 2:
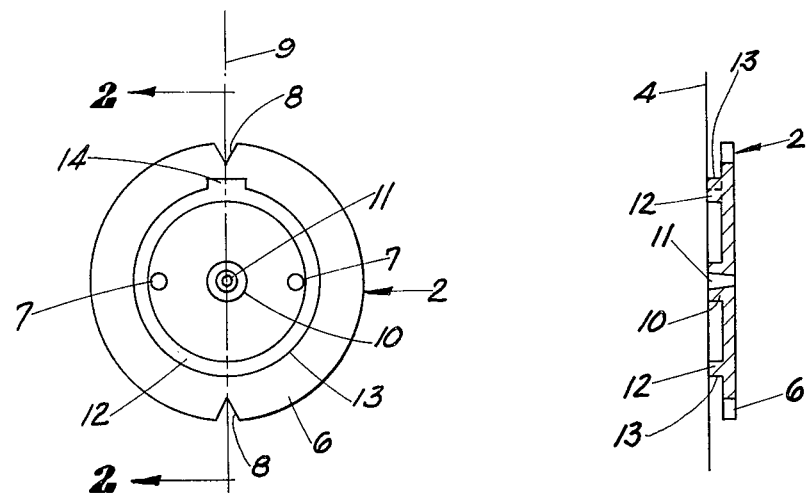
Figures 3, 4:
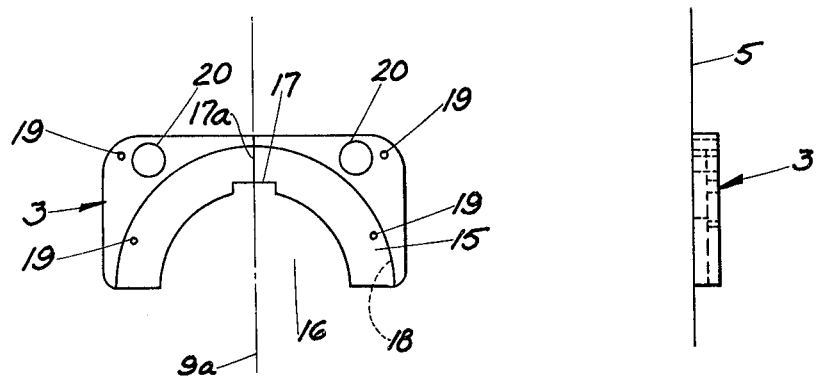

United States Patent [19]

Stein

[11] 4,437,639

[45] Mar. 20, 1984

[54] SELF-ADJUSTING SELF-LOCKING HANGER FOR PICTURES AND THE LIKE

[76] Inventor: Alvin W. Stein, 2237 Losantiville Ave., Cincinnati, Ohio 45237

[21] Appl. No.: 376,377

[22] Filed: May 10, 1982

[51] Int. Cl.³ .................................... F16M 13/00
[52] U.S. Cl. .................................. 248/558; 248/489
[58] Field of Search ........... 248/495, 496, 497, 224.1, 248/223.4, 222.3, 558, 489, 477, 291, 476

[56] References Cited

U.S. PATENT DOCUMENTS

| | | | |
|---|---|---|---|
| 999,961 | 8/1911 | Colas | 248/496 X |
| 1,065,350 | 6/1913 | Fuller | 248/497 |
| 2,488,925 | 11/1949 | Miller | 248/495 |
| 3,622,116 | 11/1971 | Fellows | 248/224.1 X |
| 4,040,593 | 8/1977 | Wiley | 248/291 X |

Primary Examiner—J. Franklin Foss
Assistant Examiner—David L. Talbott
Attorney, Agent, or Firm—Frost & Jacobs

[57] ABSTRACT

A self-adjusting picture hanger having a wall mount member fixedly attached to the wall which rotatably coacts with a picture mount member secured to the rear of the picture. In one orientation, the members are free to rotate with each other so that the picture seeks and maintains a true vertical position. In a second orientation, a key on the wall mount member engages a notch on the picture mount member to fix the picture in a vertical position. The wall mount member is provided with notches which accept a plumb line for easily orienting the wall mount member.

9 Claims, 5 Drawing Figures

SELF-ADJUSTING SELF-LOCKING HANGER FOR PICTURES AND THE LIKE

SUMMARY OF THE INVENTION

The present invention is directed to a hanger particularly suited for pictures and the like, and more specifically to a picture hanger which is self adjusting to insure that the picture hangs straight at all times.

Pictures or other wall hangers are conventionally mounted on the wall by placing a tack, nail or screw in each upper corner of the picture, tightly stringing a wire between the screws, and hanging the picture by the wire on a nail or screw driven into the wall. Inevitably, after a period of time, the wire will slip on the nail or screw in the wall, with the result that the picture hangs crookedly.

The present invention is directed to a simple device for preventing this from happening. The device includes a wall mount member which is fixedly attached to the vertical wall surface upon which the picture is to be placed, and a picture mount member which is fixedly attached to the rear surface of the picture along its vertical center line. When the members are connected together in one way, they are permitted to rotate with respect to each other until the picture hangs straight. Even if the picture is displaced from this position, it will automatically tend to return to its straight hanging position.

When the members are connected together in a second way, rotation between them is prevented so that the picture is fixed in the straight hanging position. In either event, the members may be easily disengaged from each other so that the picture can be removed from the wall.

The wall mount member also includes an alignment feature for initially attaching it to the wall surface to assure that the picture will hang in a straight line. As will become apparent from the detailed description which follows, the device may be easily and inexpensively fabricated from molded plastic or the like.

Wall mount member 2 is formed by a circular disk 6 having a pair of diametrically opposed mounting holes 7 spaced inwardly from the peripherial edge of the disk. As best shown in FIG. 1, a pair of V-shaped notches 8 is provided along the vertical center line 9 of disk 6, the function of which will be described hereinafter. The central portion of disk 6 is provided with a hub 10 having a mounting hole 11 extending therethrough along the central axis of disk 6.

One major surface of disk 6 is provided with an outwardly extending circular rib 12 which is spaced beyond mounting holes 7. It will be observed that circular rib 12 is of sufficient height to form a smooth cylindrical outer surface 13. Surface 13 is provided with an outwardly extending key portion 14 of generally rectangular cross section which is oriented along a line extending between notches 8.

Wall mount member 2 is attached to the vertical wall surface 4 such that a vertical line passes through notches 8. This may be accomplished by first securing the wall mount member to the wall by a nail or screw inserted through mounting hole 10 to a sufficient depth to hold the wall mount member in place, while still permitting the member to be rotated. A string with a weight at one end forming a plumb line may then be suspended near the wall mount member or hooked over the upper notch, and the member rotated until a line passing through notches 8 lies parallel to the vertically hanging string. In this regard, other indicia may be substituted for notches 8. It will be understood that wall mount member may be oriented so that key portion 14 lies above or beneath mounting hole 11. Once the wall mount member 2 is properly oriented, it may be permanently secured in position to the wall surface by additional screws or nails inserted in mounting holes 7. In any event, as best seen in FIG. 2, wall mount member 2 is attached so that circular rib 12 abuts the wall surface, thereby forming a space between the outer flange-like periphery of disk 6 and wall surface 4. It will be further observed that notches 8 may be used to align the wall mount member 2 and hence the associated picture at a particular desired angle. This feature may be desirable center line 9a of the picture or picture frame bisects notch 17. A vertical guide line 17a may be placed at the midpoint of notch 17 to assist in properly positioning the picture mount member to insure that the picture mount member will be attached to the picture or frame at a point lying along a vertical line passing through the center of gravity of the picture.

Figure 5:
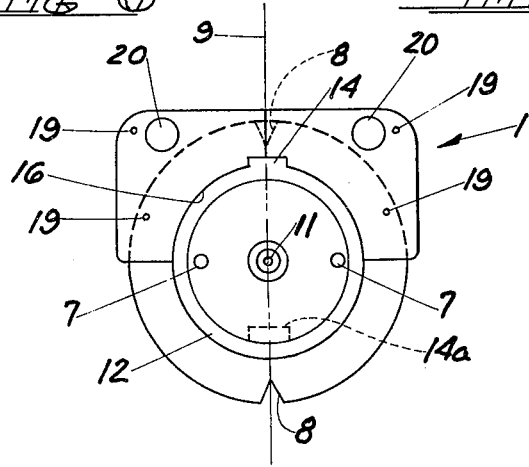

After the wall and picture mount members have been fixedly attached to their respective mounting surfaces, they may be connected together as illustrated in FIG. 5 by merely lowering the picture mount member 3 over the wall mount member 2 so that the upper portion of circular rib 12 enters semi-circular cut-out 16. If the wall mount member has been oriented so that key portion 14 is at the top as illustrated in FIG. 1, the key portion will mate with notch 17 preventing relative rotational movement between the wall and picture mount members.

If key portion 14 is oriented at the bottom of wall mount member 2 as illustrated at 14a in dashed lines in FIG. 5, the uppermost part of cylindrical surface 13 will make rolling contact with the inner surface associated with semi-circular cut-out 16. Inasmuch as the wall and picture mount members are now free to pivot in rolling contact with respect to each other, the picture attached to the picture mount member will seek a position where a line drawn through the center of gravity of the picture will pass through mounting hole 11. Since the picture mount member 3 has been mounted so that the line 9a passing through the center of gravity also passes through the central part of the mount member, the line passing through the center of gravity of the picture will also coincide with the vertical center line 9 of the wall mount member. Consequently, the picture will seek and maintain a true vertical position.

It will be understood that each of the components comprising the self-adjusting hanger of the present invention may be constructed of any suitable material, and in particular a molded plastic material. Furthermore, wall mount member 2 and picture mount member 3 may each be molded of unitary construction.

It will be further understood that various changes in the details, materials, steps and arrangements of parts, which have been herein described and illustrated in order the explain the nature of the invention, may be made by those skilled in the art within the principle and scope of the invention as expressed in the appended claims.

The embodiment of the invention in which an exclusive property or privilege is claimed are as follows:

1. A self-adjusting hanger for mounting pictures and the like to a vertical wall surface comprising a wall mount member having means to fixedly mount it to the wall surface and a picture mount member having means to fixedly mount it to the rear surface of the picture along the vertical center line thereof, each of said members having cooperating arcuate surfaces by which one of the members may pivotally rest on the other member and rotate with respect thereto to allow the picture to hang straight, said wall mount member including a mounting plate and circular rim forming one of said arcuate surfaces extending outwardly from one major surface of said plate, said rim being configured to abut the wall surface to space said plate therefrom, said picture mount member including a semi-circular cut-out forming said other surface, said rim mating within said cut-out, portion of said rim forming a key portion, said cut-out including a notch dimensioned to mate with said key portion to prevent relative rotation between said members, said mounting means further including means for attaching the wall mount member in first orientation where said key portion engages said notch to prevent relative rotation between said members and a second orientation wherein said key portion and said notch are unmated to permit relative rotational movement between said members.

2. The hanger according to claim 1 wherein each of said surfaces is of circular shape.

3. The hanger according to claim 1 including means for vertically aligning said hanger.

4. The hanger according to claim 3 wherein said aligning means comprises spaced indicia positioned on the wall mount member which can be aligned along a true vertical line to properly orient the hanger.

5. The hanger according to claim 4 wherein said wall mount member mounting means comprises means for rotatably securing said wall mount member to the wall surface.

6. The hanger according to claim 1 including means for rotatably securing said wall mount member to the wall mount surface.

7. The hanger according to claim 6 including a pair of spaced indicia positioned on said wall mount member along a line extending through said key portion, said wall mount member being rotatable to align the hanger along a true vertical line.

8. The hanger according to claim 7 wherein at least one of said indicia comprises a plumb line accepting notch.

9. The hanger according to claim 1 including means for positioning said picture mount member along a vertical line passing through the center of gravity of the picture.

* * * * *